Feb. 6, 1968  A. F. KOMOROWSKI ET AL  3,367,030
COMPENSATED ELLIPSOGRAPH
Filed Feb. 17, 1967  2 Sheets-Sheet 1

INVENTORS
ALEXANDER F. KOMOROWSKI
HENRY A. KOMOROWSKI
BY
ATTORNEY

Feb. 6, 1968  A. F. KOMOROWSKI ETAL  3,367,030
COMPENSATED ELLIPSOGRAPH
Filed Feb. 17, 1967  2 Sheets-Sheet 2
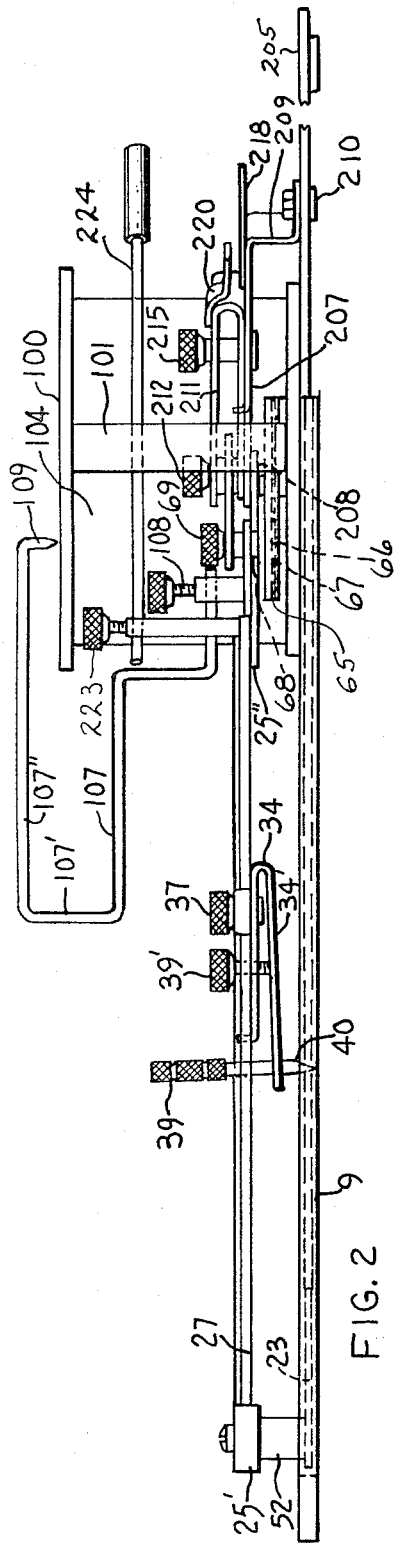
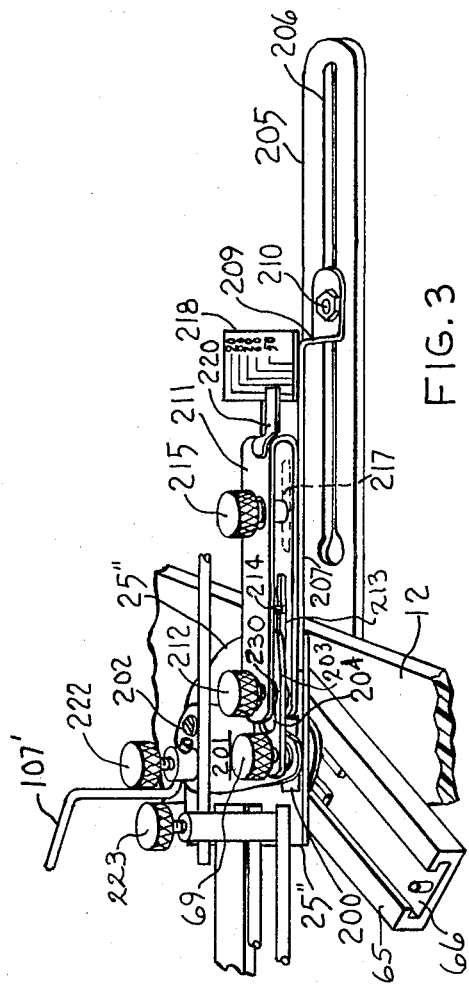
INVENTORS
ALEXANDER F. KOMOROWSKI
HENRY A. KOMOROWSKI
BY
ATTORNEY 3,367,030
COMPENSATED ELLIPSOGRAPH
Alexander F. Komorowski and Henry A. Komorowski, both of 69 E. 4th St., Bayonne, N.J. 07002
Filed Feb. 17, 1967, Ser. No. 616,937
3 Claims. (Cl. 33—30)

ABSTRACT OF THE DISCLOSURE

In order to correct the imperfect ellipses made by ellipsographs, such as those described in Patent 3,167,863, this invention provides a series of linkages connected to the pivoted end of the minor diameter scale arm, whereby the offset relationship produced thereby corrects the movement of the scale arm carrying the scriber, so that a true ellipse is inscribed.

Background of the invention

This invention relates to ellipsographs. More specifically, it deals with ellipsographs provided with compensation means designed to give more accurate ellipses than have been possible with prior art devices.

An ellipse can be defined as a projection or shadow of a circle on a plane. When the circle is parallel to the plane depicting its shadow or projection, i.e., when the angle made by the circle with respect to the projection plane is 90°, the projection is that of a complete circle. Also, when this angle of tilt of the circle is zero, the projection is a straight line. Between these two angular positions of the circle, the projection will be an ellipse having a constant major axis and a variable minor axis, depending upon the angle of tilt of the circle with respect to the projection plane.

The ellipses of the patents, heretofore mentioned, have a minor axis (or angle of tilt) scale arm carrying a sliding scribe and having one end partially rotatable and sliding between the back and front frame members, the major diameter scale being on the front frame member. The other (free) end of the scale arm is pivotally mounted on a slidable tenon riding in a groove of a short arm pivoted to the right side frame member.

In Patent No. 3,167,863, i sued to Alexander F. Komorowski and Henry A. Komorowski, there is described an ellipsograph, the general structure of which is incorporated in the device of the present invention. Patent No. 3,230,623, issued to the aforesaid patentees, discloses improvements which make the aforesaid ellipsograph adaptable for the drawing of perspective views of objects at any desired angle of tilt.

It has been found, however, that although fairly accurate ellipses can be drawn with the ellipsographs of the aforesaid patents, when the size of the ellipsographs is large, an imperfect ellipse is drawn when smaller ellipsographs are used, i.e., size usually employed by draftsmen.

The present invention serves to overcome the aforesaid imperfection by use of a horizontal compensator arm projecting laterally from the right side of the base, and a slide arm, one end of which is slidably connected onto the compensator arm and the other being pivotally connected to an extension on the free end of the scale arm. A series of linkages mounted between the tenon and the slide arm provides an adjustable offset relationship to correct the movement of the pivoted end of scale arm, so that the scriber will inscribe a true ellipse.

Description of the prior art

In Patent No. 3,167,863, issued to the present applicants, an ellipsograph is described wherein a minor diameter scale arm has its left end partially rotatably and slidably mounted between frame members, and its right end pivoted on a tenon slidably mounted on a shorter arm. The major diameter scale is provided on the frame member adjacent the sliding end of the scale arm, and a sliding scriber on the scale arm enables drawing of an ellipse when the shorter arm is rotated.

In Patent No. 3,230,623, the ellipsograph of the aforesaid patent is provided with a raised platform on which a stylus (having its other end connected to the scale arm pivot) is used to trace a drawing mounted on the platform, whereby perspective views may be drawn at various angles of tilt, as set on the minor diameter scale.

Summary of the invention

To correct the inaccuracies of the prior art ellipsographs already referred to, the present invention provides a compensator arm extending from the right frame side in line with the pivot mounted therein, said arm having a slot in which rides the pivoted end of the slide arm. The other end of the slide arm is pivoted to an extension on the scale arm to the right of its pivot.

Another arm is slidably attached to the top of the slide arm, and it is pivoted to one end of a short arm having a slot in which the latter pivot may be moved and then fastened thtreto.

An offsetting plate is pivoted at its rear portion to the scale arm extension. The other end of the slotted arm is pivoted at the forward end of the offsetting plate, thus creating a series of linkages which provide enough offsetting of the pivoted scale arm end to enable the scriber to inscribe a perfect ellipse. This linkage provides the necessary amount of offset, from zero at zero degree of tilt, to a maximum value at 90° of tilt, so that the pivoted end of the scale arm (carrying the scriber) moves arcuately as it moves vertically in a fashion to permit the scriber to inscribe in the correct manner.

Brief description of the drawings

The invention will be more readily understood by reference to the accompanying drawings in which a preferred embodiment is described, and in which the same numerals refer to similar parts in the various figures.

In the drawings:

FIGURE 2 illustrates a front view of the ellipsograph depicted in FIGURE 1 with line-up stop omitted, and FIGURE 3 shows a perspective front view of the compensator portion of the ellipsograph of FIGURES 1 and 2, with the remaining portions cut away.

Description of the preferred embodiments

Figure 1:
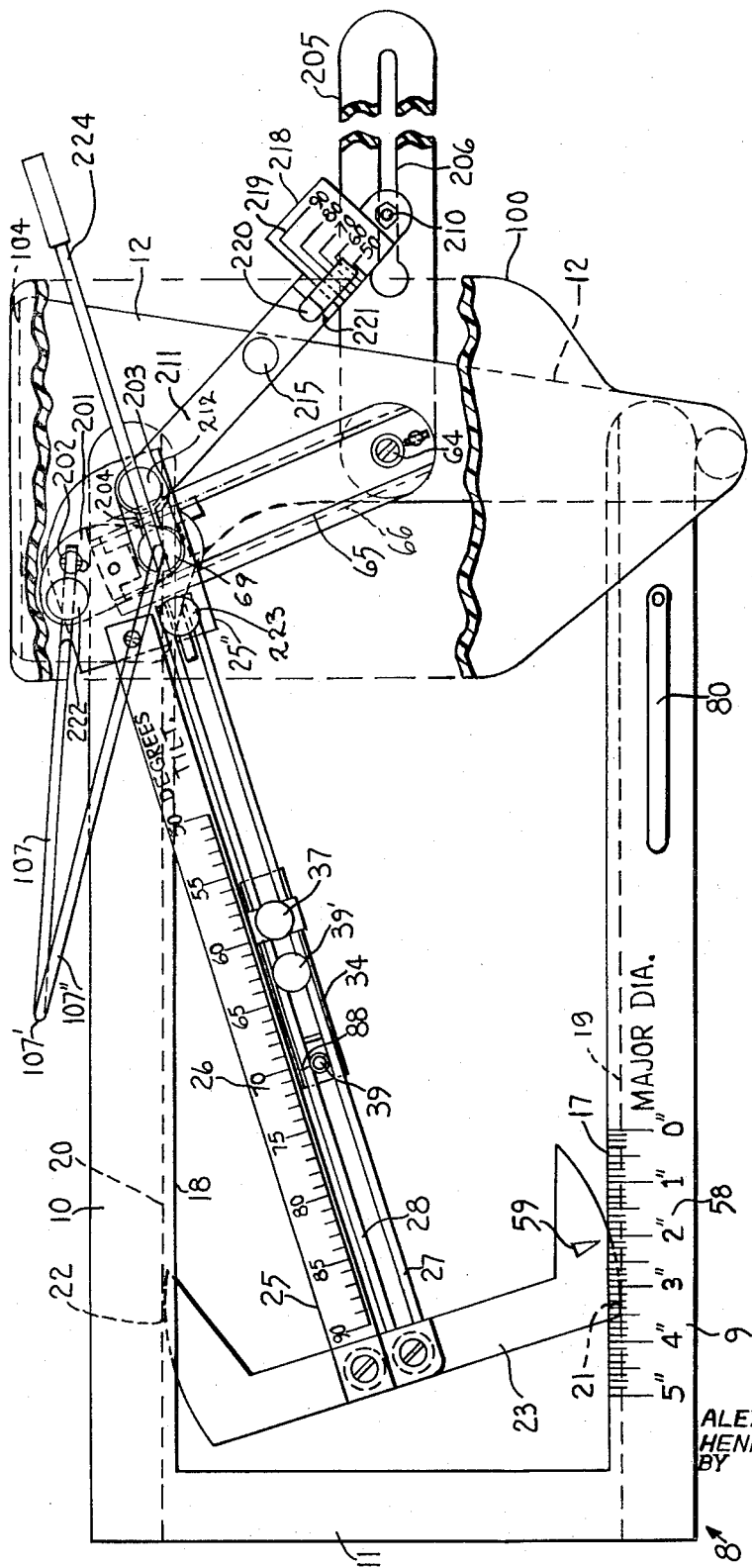
FIGURE 1 depicts a top or plan view of a preferred embodiment of an ellipsograph of the present invention, with a portion of the tracing platform cut away, and the center portion of the compensator slide arm cut away.

Referring again to the drawings, it will be noted that the numbering of the parts, in common with those in the drawings of Patent 3,230,623, is the same. This is due to the fact that, except for the compensating features, the remaining parts of the ellipsograph are the same as those in the patent, and the operation and use thereof are the same. The base is a frame 8 having front 9, back 10, and sides 11 and 12. Inner edges 17 and 18 of frame members 9 and 10 are provided with grooves or races 19 and 20, respectively, in which slide the rounded edges 21 and 22 of slide 23. Arcuate edges 21 and 22 have a common diameter.

Scale arm 25 is affixed at one end to slide 23 by post 52, and it has printed scale 26 for the minor axis (expressed here in degrees of tilt), which is used in conjunction with arrow indicator 88 on scriber slide 34. The latter is able to slide on rods 27 and 28 mounted between the ends 25' and 25" of scale arm 25, and it may be locked onto the rods by knob screw lock 37. Scriber slide 34 carries vertically-adjustable scribe point 40, which can be lowered into position on the paper on which the ellipse is to be drawn, the point being manipulated by screw knob 39' which may raise or lower the lower spring arm 34' to which scriber 39 is attached.

Affixed pivotally to the middle of the frame right side 12, opposite slide 23, is short arm 65, pivoted at its end 64, and capable of being rotated about said pivot. Arm 65 has an inwardly-cut groove 66 cut lengthwise in its upper surface, and lockable tenon 67 is slidable in this groove while being retained therein. Screw post 69 is attached to tenon 67, and is designed to lock it in place in groove 66.

The other end 25" of scale arm 25 is provided with a forwardly-disposed slot 200, through which post 69 protrudes and in which post 69 is designed to ride when its fastening screw is loosened. Plate 201 is superimposed over scale arm end 25", and is pivotally affixed thereto at rearwardly-disposed pivot 202. This plate 201 has a forwardly-located hole through which post 69 emerges.

Disposed over plate 201 is a narrow plate 203 through which post 69 also emerges. To the right of post 69, plate 203 is provided with a long slot 204 in which post 212 is designed to slide, when not tightened. Post 69 is mounted so that, when it is screwed down tightly, it locks in place slide 23, arm end 25", and plates 201 and 203, in their preset positions.

Attached to the base side 12, and serving as a projection thereof, in parallel relation to back 10, is projecting compensator arm 205 having a long slot 206 therein. Another arm 207 has one end pivoted, at 208, to the right-most end of scale arm end 25". At its other end, arm 207 is bent downwardly at 209, and it terminates with a sliding pivot 210 which is designed to slide in slot 206.

Disposed over a portion of arm 207, is U-shaped member 211, having both of its leg ends penetrated by screw post 212. Post 212 also passes through slot 204 in arm 203, so that the right end of narrow arm 203 is located between bearings 230 between the legs of U-member 211.

The lower leg of U-member 211 is provided with a slot 213, and arm 207 is provided on its upper surface with a projecting pin 214 which is disposed in slot 213 and which serves as a guide when U-member 211 slides in parallel relationship over arm 207. Screw post 215 is mounted near the crown end of U-member 211. It penetrates both arms of member 211, as well as arm 207, at nut 216, and it serves to lock U-member 211 to arm 207 in any position in which post 215 is set, while it is in slot 217 of arm 207 (in which slot it may ride when screw post 215 is not tightened). Post 212 is mounted so that, when it is screwed down tightly, it locks in place the legs of U-member 211 and narrow arm 203, in their preset positions.

Attached to arm 207, near bend 209, is a compensation scale 218, carrying markers 219, at which markers the end of indicator tab 220 is to be set for compensation for the various degrees of tilt settings, corresponding to the setting of marker 88 with respect to scale 26. Tab 220 is attached to the edge of crown 221 of U-member 211.

Attached to plate 201 is screw post 222 which holds the end of arm 107-107'-107", terminating in downwardly-directed stylus 109 over platform 100 on which the drawing, to be traced with the stylus, is affixed. Rear side 104 and leg 101 serve to connect platform 100 with the base. Screw post 223, attached to arm end 25", serves to hold manipulating rod 224, which may be used to move the adjusted and locked assembly when the ellipse or display is to be drawn or outline by dots.

The compensation of the ellipsograph is effected as follows:

With screw posts 69, 212 and 215 loosened, the center of screw post 212 is first aligned with the center of pivot 208 on a common horizontal line, preferably using line-up stop 80 for this purpose. After this, screws 215 and 212 are tightened. A line is then drawn on compensation plate 218 in alignment with the tip of index marker 220, to designate the setting for 0° angle of tilt (if such setting is desired), and this is inscribed as such (219) on plate 218. Scriber slide 34 then is moved until indicator 88 is aligned with, say the 50° angle of tilt on scale 26. Then, screw posts 215 and 212 are loosened and U-member 211 is slid at random, and the screw posts are tightened, after which the right end 25" of scale arm 25 is pushed upward with scriber point 40 in scribing position to inscribe a mark on the paper on a drawing board. Should this mark move to the left or right, this would indicate that U-member 211 has been moved too far to the left or right, as the case may be. When the adjustment finally caused the scriber to move vertically, this indicates that the proper compensation has been effected, whereupon the 50° angle of tilt mark is applied (219) on plate 218 in line with the tip of marker index 220. The same is done for the other angle of tilt markings on plate 218, until all of the desired markings 217 are inscribed.

The operation of the compensated ellipsograph of the present invention is as follows:

When it is to be used for drawing ellipses, the unit is set for line-up position by use of line-up stop 80. Then indicator 88 is set alongside the desired angle of tilt (minor axis) on scale 26, and knobs 69, 212 and 215 are loosened and slide indicator 59 is set alongside of the major axis scale 58 for the desired ellipse dimension, and the tip of indicator tab 220 is set on scale 219 to conform with the setting of indicator 88 on scale 26 (to effect the compensation). After this, the knobs 69, 212 and 215 are tightened, scriber 39 is lowered onto the material to be inscribed with the ellipsograph, and handle 224 is used to rotate the moving parts around pivot 64 to inscribe the ellipsograph of the desired dimensions.

If the unit is used for preparing a perspective view at a specific angle of tilt, from a plan drawing, to be traced, the operation is as follows:

The drawing, which is desired to be displayed at various angles of tilt on a paper sheet under scriber 39, is affixed to platform 100 under stylus 109. The angle of tilt settings are set for the desired value on scales 26 and 219, which is done when screw posts 69, 212 and 215 are in loosened condition. Tracing stylus 109 is positioned so that it is directly over a centering mark on platform 100 when the scriber point 40 is in line with the center post 69, and pivot 64 of rotatable arm 66, i.e., when the ellipsograph is in set-up position.

After the ellipsograph is set up for the desired angle of tilt, the round portions of the drawing are traced, and the projecting portions and straight lines are first spotted at their ends by means of dots made by moving raised scriber point 40 to the desired termini (as in Patent 3,230,623), and then dropping the point after it has been spotted by tracing stylus 109. The lines between the dots are filled in by a ruler.

We claim:

1. A compensated ellipsograph, of the type described, having a frame base with front, back and side members, and comprising:
    a minor axis scale arm carrying an angle of tilt scale and having one end designed to rotate partially and to slide laterally between said front and back frame members,
    a scriber slide slidably mounted on said scale arm and carrying a vertically-adjustable scribe and also serving as an indicator for said angle of tilt scale,
    an extension disposed on the other end of said scale arm,
    a short arm pivoted at its one end to the side of said frame adjacent said extension and having a laterally-directed sliding groove on its upper surface, a laterally-movable tenon disposed in said groove, and a connection projecting upwardly from said tenon, a compensation arm projecting from the frame side opposite the scale arm end, and having an elongated slot therein, a slide arm having a pivot at its one end slidably connected in said slot of said compensator arm, and having a pivot connection at its other end with said scale arm extension, a series of offsetting linkages connected at one end to said tenon connection and at the other end to said slide arm and designed to provide an adjustable offset relationship with respect to said scriber-carrying scale arm, whereby said scriber is enabled to draw a perfect ellipse, an angle of tilt scale disposed on said slide arm for compensation indication as related to said scale arm readings, and an indicator disposed on said linkages adjacent said slide arm scale for indicating the angle of tilt compensation required.

2. A compensated ellipsograph, comprising:

a frame base having a front, a back and sides, a minor axis scale arm carrying an angle of tilt scale and having one end designed to rotate partially and to slide laterally between said front and back frame members, a scriber slide slidably mounted on said scale arm and carrying a vertically-adjustable scribe and also serving as an indicator for said angle of tilt scale.

a plate extension disposed on the other end of said scale arm and having a laterally-directed slot in its forward position, a short arm pivoted at its one end to the side of said frame adjacent said extension and having a laterally-directed sliding groove on its upper surface, a laterally movable tenon disposed in said groove, and a first lockable screw post projecting upwardly from said tenon and through said slot in said scale arm extension, an offsetting plate disposed over said scale arm and pivotally affixed to the rearward position of said extension and having a hole in its forward portion through which projects said first lockable screw post, a narrow connector plate disposed over said offsetting plate and having a slot through which projects, at the one end of said connector plate, said first lockable screw post, a compensator arm projecting laterally from the frame side carrying said pivot, and having an elongated slot therein, a flat slide arm pivotally attached at its one end to the outermost and forward portion of said scale arm extension and having an upwardly-projecting guide means, and terminating with a pivot slidably connected in said groove of said compensator arm, a flat U-shaped member laid on its side over and partially covering said later slide arm and having its leg ends straddling the other end of said connector plate, and having a slot in its lower leg in which said slide arm guide is designed to ride, a second lockable screw post penetrating the upper leg of said U-member, passing through said slot in said connector plate, and pivotally engaging the lower leg of said U-member, a third lockable screw post passing through both legs of said U-member and designed to slide in lockable relation in said slot in said slide arm, an indicator projecting from the crown of said U-member, and a scale disposed on said slide arm adjacent said indicator and carrying angle of tilt markings inscribed thereon for various angles of tilt positions of said scriber when said U-member is set so that said scriber draws a vertical line when said scale arm extension is pushed vertically from a horizontal alignment of said second screw post with said pivot on said flat side arm.

3. A compensated ellipsograph, according to claim 2, wherein a raised platform is provided over the pivoted scale arm portion for holding a drawing to be traced, and a stylus arm connected to the rearward portion of said offsetting plate and extending over said platform and terminating with a downwardly-directed tracing stylus.

No references cited.

HARRY N. HAROIAN, *Primary Examiner.*